United States Patent
Kaneno et al.

(10) Patent No.: US 9,522,984 B2
(45) Date of Patent: Dec. 20, 2016

(54) POLYPROPYLENE RESIN COMPOSITION AND EXPANDED MOLDING

(71) Applicant: JAPAN POLYPROPYLENE CORPORATION, Tokyo (JP)

(72) Inventors: Motoki Kaneno, Mie (JP); Koji Yamashita, Mie (JP); Hiroshi Tsuji, Mie (JP); Akihiro Suzuki, Mie (JP); Shinichi Kitade, Mie (JP); Masaru Aoki, Mie (JP); Isamu Terayama, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 360 days.

(21) Appl. No.: 14/344,553

(22) PCT Filed: Oct. 17, 2012

(86) PCT No.: PCT/JP2012/076762
§ 371 (c)(1),
(2) Date: Mar. 12, 2014

(87) PCT Pub. No.: WO2013/058255
PCT Pub. Date: Apr. 25, 2013

(65) Prior Publication Data
US 2015/0044405 A1   Feb. 12, 2015

(30) Foreign Application Priority Data

Oct. 17, 2011 (JP) ................................ 2011-227719
Oct. 17, 2011 (JP) ................................ 2011-227723

(51) Int. Cl.
*C08J 9/06* (2006.01)
*B29C 51/02* (2006.01)
(Continued)

(52) U.S. Cl.
CPC .................. *C08J 9/06* (2013.01); *B29C 44/20* (2013.01); *B29C 44/50* (2013.01);
(Continued)

(58) Field of Classification Search
CPC ............... C08J 9/06; C08J 9/0061; C08J 9/08; C08J 2201/03; C08J 2323/14; C08J 2423/12; C08J 5/18; C08J 2203/02; C08J 2323/12; C08L 23/12; C08L 23/14; C08L 2203/14; C08L 2205/025; C08L 2205/035; B29C 49/04; B29C 51/02; B29C 47/0026; B29C 47/0004; B29C 47/0042; B29C 47/0054; B29C 47/92; B29C 2947/922; B29C 2947/92695; B29C 44/20; B29C 44/50; B29K 2023/12; B29K 2023/14; B29K 2105/0085; B29K 2105/0088; B29K 2105/04; C08F 210/06; C08F 210/16; C08F 2500/11; C08F 2500/12; C08F 2500/17

See application file for complete search history.

(56) References Cited

U.S. PATENT DOCUMENTS 4,916,198 A   4/1990 Scheve et al.
2010/0298456 A1  11/2010 Nakajima et al.
2011/0124798 A1   5/2011 Roegiers et al.

FOREIGN PATENT DOCUMENTS

CN   101896518 A   11/2010
JP   62-121704 A   6/1987
(Continued)

OTHER PUBLICATIONS

English machine translation of JP2010121053.*
(Continued)

*Primary Examiner* — Michael C Miggins
(74) *Attorney, Agent, or Firm* — Oblon, McClelland, Maier & Neustadt, L.L.P.

(57) ABSTRACT

A polypropylene-based resin composition is provided that can provide a foam molding that exhibits an excellent closed cell characteristic and excellent extrusion characteristics, that is light weight and has a rigid feel, and that has an excellent recyclability.

This polypropylene-based resin composition contains 100 weight % or is less than 100 weight % but at least 70 weight % of component (A) below and contains 0 weight % or is greater than 0 weight % but not more than 30 weight % of component (B) below, component (A):
a propylene-based resin composition that comprises at least the following two components: a propylene-α-olefin copolymer (A1) satisfying conditions (A-1) to (A-3) and a propylene homopolymer (A2), (A1) and (A2) being obtained by polymerization by a multi-stage polymerization method, and this propylene-based resin composition having a content of (A1) of 1 to 20 weight % and a content of (A2) of 99 to 80 weight %, having a melt flow rate in the range from 5 to 20 g/10 minutes and exhibiting strain hardening in a measurement of extensional viscosity at a temperature of 180° C. and a strain rate of 10 s$^{-1}$, (A-1) an α-olefin content of 15 to 85 weight %,
(A-2) an intrinsic viscosity η of 5 to 20 dL/g,
(A-3) a Mw/Mn of 5 to 15;

component (B):
a propylene-based resin composition comprising at least the following two components: a propylene homopolymer or a propylene-α-olefin copolymer having a content of non-propylene α-olefin of less than 1 weight % (B1), which has an MFR of 10 to 1000 g/10 minutes, and a propylene-α-olefin copolymer (B2) that has a weight-average molecular weight of 500,000 to 10,000,000 and a content of non-propylene α-olefin of 1 to 15 weight %, (B1) and (B2) being obtained by polymerization by a multistage polymerization method, and this propylene-based resin composition having a content of (B1) of 50 to 90 weight % and a content of (B2) of 50 to 10 weight %, and satisfying prescribed conditions (B-1) to (B-3).

12 Claims, 1 Drawing Sheet

(51) Int. Cl.
- C08L 23/12 (2006.01)
- B29C 47/00 (2006.01)
- B29C 47/92 (2006.01)
- C08J 9/00 (2006.01)
- C08J 9/08 (2006.01)
- B29C 44/20 (2006.01)
- B29C 44/50 (2006.01)
- C08J 5/18 (2006.01)
- C08L 23/14 (2006.01)
- B29C 49/04 (2006.01)
- B29K 23/00 (2006.01)
- B29K 105/00 (2006.01)
- B29K 105/04 (2006.01)

(52) U.S. Cl.
CPC ...... *B29C 47/0026* (2013.01); *B29C 47/0042* (2013.01); *B29C 47/0054* (2013.01); *B29C 47/92* (2013.01); *B29C 51/02* (2013.01); *C08J 5/18* (2013.01); *C08J 9/0061* (2013.01); *C08J 9/08* (2013.01); *C08L 23/12* (2013.01); *C08L 23/14* (2013.01); *B29C 47/0004* (2013.01); *B29C 49/04* (2013.01); *B29C 2947/922* (2013.01); *B29C 2947/92695* (2013.01); *B29K 2023/12* (2013.01); *B29K 2023/14* (2013.01); *B29K 2105/0085* (2013.01); *B29K 2105/0088* (2013.01); *B29K 2105/04* (2013.01); *C08J 2201/03* (2013.01); *C08J 2203/02* (2013.01); *C08J 2323/12* (2013.01); *C08J 2323/14* (2013.01); *C08J 2423/12* (2013.01); *C08L 2203/14* (2013.01); *C08L 2205/025* (2013.01); *C08L 2205/035* (2013.01); *Y10T 428/1376* (2015.01)

(56) References Cited

FOREIGN PATENT DOCUMENTS

| | | |
|---|---|---|
| JP | 06-157666 A | 6/1994 |
| JP | 2004-339365 | 12/2004 |
| JP | 2008-162022 A | 7/2008 |
| JP | 2009-108229 | 5/2009 |
| JP | 2009-126140 A | 6/2009 |
| JP | 2009-132893 A | 6/2009 |
| JP | 2009-275117 A | 11/2009 |
| JP | 2009-299029 | 12/2009 |
| JP | 2010-121053 | 6/2010 |
| JP | 2010-121054 | 6/2010 |
| WO | 99/27007 | 6/1999 |

OTHER PUBLICATIONS

English machine translation of JP2009299029.*
International Search Report issued Nov. 13, 2012, in PCT/JP2012/076762, filed Oct. 17, 2012.
Combined Office Action and Search Report issued Jun. 30, 2015 in Chinese Patent Application No. 201280050735.4 (with English language translation and English Translation of Category of Cited Documents).
Office Action issued Sep. 15, 2015 in Japanese Patent Application No. 2012-229470 (with English language translation).

* cited by examiner

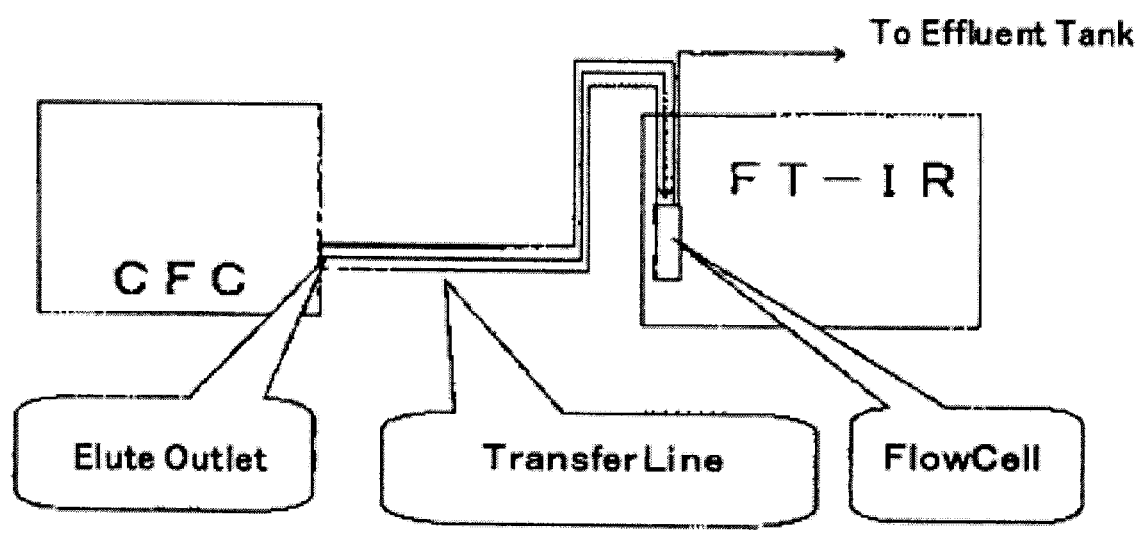

POLYPROPYLENE RESIN COMPOSITION AND EXPANDED MOLDING

TECHNICAL FIELD

The present invention relates to a polypropylene-based resin composition and to a foam molding, and relates to a polypropylene-based resin composition that can provide a foam molding that exhibits an excellent closed cell characteristic and excellent extrusion characteristics, that is light weight and has a rigid feel, and that has an excellent recyclability, and also relates to a foam molding obtained using this polypropylene-based resin composition.

BACKGROUND ART

Polyolefin-based resin foams are light weight and exhibit an excellent heat resistance and impact resistance, and as a result are widely used in applications such as core materials for automotive interior trim, building materials, stationery, food containers, and so forth.

These polyolefin-based resin foams are obtained, for example, by mixing any of various foaming agents under the application of pressure into a molten polyolefin using an extruder and then carrying out extrusion and foaming under atmospheric pressure from a die attached at the end of the extruder.

However, a problem with conventional foams has been the difficulty of maintaining, in the molten resin, the individual bubbles (also referred to below as "cells") having the produced gas partial pressure, which has resulted in the rupture of the individual cells and a pronounced tendency for open cells to be produced.

Various means for raising the melt tension of the resin used and thereby raising the cell retention force have been proposed as methods for obtaining a foam with few open cells (excellent closed cell characteristic).

For example, methods have been proposed in which the melt tension is raised through the addition of an ultra-high molecular weight component. However, generally when a resin having a high melt tension is used, the cell retention force is in fact raised, but the viscosity also becomes too high and an expansion ratio that corresponds to the amount of foaming agent addition is not obtained. Moreover, there is a large load on the extruder, and, in those instances in which the maintenance of a high productivity is sought, the load on the extruder is increased and the extrusion moldability declines and, in addition, the temperature of the resin rises due to shear heat generation and cell growth cannot be inhibited through cooling and open cells are produced.

In addition, polypropylene-based resins that are characterized by a high melt tension are commercially available in the form of, for example, propylene-based resins that have been subjected to electron beam crosslinking, as in, e.g., Patent Document 1, and propylene-based resins that have been crosslinked using, e.g., a peroxide, as in, e.g., Patent Documents 2, 3, and 4. However, the use of a crosslinking treatment to raise the melt tension has led to a substantial decline in the melt properties when the edge from foam sheet molding or the excess after container molding is returned again to foam sheet molding, and disadvantage in cost, and due to the crosslinking, this has also been unsatisfactory with regard to extrusion stability and odor.

CITATION LIST

Patent Literature

Patent Document 1 Japanese Patent Application Laid-open No. S62-121704
Patent Document 2 Japanese Patent Application Laid-open No. H6-157666
Patent Document 3 WO 99/27007
Patent Document 4 Japanese Patent Application Laid-open No. 2004-339365

SUMMARY OF INVENTION

Technical Problem

The present invention was achieved based on these circumstances and has as an object the introduction of a foam that exhibits an excellent closed cell characteristic and excellent extrusion characteristics and that is light weight, has a rigid feel, and has an excellent recyclability.

Solution to Problem

As a result of focused investigations regarding this object, the present inventors discovered that a foam that exhibits an excellent closed cell characteristic and excellent extrusion characteristics and that is light weight, has a rigid feel, and has an excellent recyclability can be produced by using a material comprising a foaming agent and a polypropylene-based resin composition that has a special constitution. The present invention was achieved based on this discovery.

Thus, the present invention provides a polypropylene-based resin composition and a foam molding described below.

[1] A polypropylene-based resin composition comprising at least two components (A) and (B) below, wherein, based on 100 weight % for the sum of components (A) and (B), the component (A) content is 100 weight % or is less than 100 weight % but at least 70 weight % and the component (B) content is 0 weight % or is greater than 0 weight % but not more than 30 weight %, component (A):
    a propylene-based resin composition that comprises at least the following two components: a propylene-α-olefin copolymer (component (A1)) satisfying conditions (A-1) to (A-3) below and a propylene homopolymer (component (A2)), components (A1) and (A2) being obtained by polymerization by a multistage polymerization method, and this propylene-based resin composition having a component (A1) content of 1 to 20 weight % and a component (A2) content of 99 to 80 weight % (where the sum of components (A1) and (A2) is 100 weight %), having a melt flow rate in the range from 5 to 20 g/10 minutes and exhibiting strain hardening in a measurement of extensional viscosity at a temperature of 180° C. and a strain rate of 10 s$^{-1}$, (A-1) an α-olefin content of 15 to 85 weight % (where the total amount of monomer constituting component (A1) is 100 weight %),
(A-2) an intrinsic viscosity η of 5 to 20 dL/g,
(A-3) a Mw/Mn of 5 to 15;

component (B):
    a propylene-based resin composition comprising at least the following two components: a propylene homopolymer or a propylene-α-olefin copolymer having a content of non-propylene α-olefin of less than 1 weight % (component (B1)), which has an MFR of 10 to 1000 g/10 minutes, and a propylene-α-olefin copolymer (component (B2)) that has a weight-average molecular weight of 500,000 to 10,000,000 and a content of non-propylene α-olefin of 1 to 15 weight %, components (B1) and (B2) being obtained by polymerization by a multistage polymerization method, and this propylene-based resin composition having a component (B1) content of 50 to 90 weight % and a component (B2) content of 50 to 10 weight % (where the sum of components (B1) and (B2) is 100 weight %), and satisfying the following conditions (B-1) to (B-3), (B-1) an MFR of 0.1 to 20 g/10 minutes,
(B-2) the relationship between a melt tension (MT) and the MFR satisfying the following formula $$\log MT > -0.97 \times \log MFR + 1.23,$$

(B-3) a longest relaxation time (id) of at least 100 seconds.

[2] The polypropylene-based resin composition according to [1], wherein the component (A) content is 100 weight % and the component (B) content is 0 weight %.

[3] The polypropylene-based resin composition according to [1], wherein the component (A) content is 97 to 70 weight % and the component (B) content is 3 to 30 weight %.

[4] The polypropylene-based resin composition according to any one of [1] to [3], wherein component (A) has a strain hardening exponent λmax (10) of at least 1.2 in the measurement of extensional viscosity at a temperature of 180° C. and a strain rate of 10 s$^{-1}$.

[5] A polypropylene-based resin foam molding molded by adding a foaming agent to the polypropylene-based resin composition according to any one of [1] to [4], and carrying out extrusion foam molding thereof.

[6] The polypropylene-based resin foam molding according to [5], wherein the polypropylene-based resin foam molding is a foam sheet molded by extrusion from a slit die or circular die.

[7] A polypropylene-based resin foam thermoformed article formed by thermoforming of the foam sheet according to [6].

[8] A polypropylene-based resin foam hollow molding molded by adding a foaming agent to the polypropylene-based resin composition according to any one of [1] to [4], extruding the same to give a parison, and subsequently performing blow molding within a mold.

Advantageous Effects of Invention

The polypropylene-based resin composition of the present invention provides a foam that exhibits an excellent closed cell characteristic and excellent extrusion characteristics and that is light weight, has a rigid feel, and has an excellent recyclability, and in particular can provide a material favorable for foam (multilayer) sheet applications in extrusion foam molding. The obtained polypropylene-type (multilayer) foam sheet can provide, by thermoforming, moldings that exhibit uniform and microfine foam cells. In addition, a uniform and microfine foam hollow molding can also be obtained by adding a foaming agent to the polypropylene-based resin composition of the present invention; extruding the same to give a parison; and subsequently performing blow molding within a mold.

Moreover, these moldings, because they exhibit an excellent appearance, thermoformability, impact resistance, lightness, rigidity, heat resistance, insulation behavior, oil resistance, and so forth, are favorably used for, for example, stationery files, food containers, beverage cups, display cases, auto parts, commercial and industrial components, and trays.

BRIEF DESCRIPTION OF THE DRAWING

FIG. 1 is a schematic diagram of the flow in a CFC-IR measurement.

DESCRIPTION OF EMBODIMENTS

The polypropylene-based resin composition of the present invention characteristically comprises at least two components (A) and (B) below, wherein, based on 100 weight % for the sum of components (A) and (B), the component (A) content is 100 weight % or is less than 100 weight % but at least 70 weight % and the component (B) content is 0 weight % or is greater than 0 weight % but not more than 30 weight %.

Component (A):
   a propylene-based resin composition that comprises at least the following two components: a propylene-α-olefin copolymer (component (A1)) satisfying conditions (A-1) to (A-3) below and a propylene homopolymer (component (A2)), components (A1) and (A2) being obtained by polymerization by a multistage polymerization method, and this propylene-based resin composition having a component (A1) content of 1 to 20 weight % and a component (A2) content of 99 to 80 weight % (where the sum of components (A1) and (A2) is 100 weight %), having a melt flow rate in the range from 5 to 20 g/10 minutes and exhibiting strain hardening in a measurement of extensional viscosity at a temperature of 180° C. and a strain rate of 10 s$^{-1}$, (A-1) an α-olefin content of 15 to 85 weight % (where the total amount of monomer constituting component (A1) is 100 weight %),
(A-2) an intrinsic viscosity η of 5 to 20 dL/g,
(A-3) a Mw/Mn of 5 to 15.

Component (B):
   a propylene-based resin composition comprising at least the following two components: a propylene homopolymer or a propylene-α-olefin copolymer having a content of non-propylene α-olefin of less than 1 weight % (component (B1)), which has an MFR of 10 to 1000 g/10 minutes, and a propylene-α-olefin copolymer (component (B2)) that has a weight-average molecular weight of 500,000 to 10,000,000 and a content of non-propylene α-olefin of 1 to 15 weight %, both components (B1) and (B2) being obtained by polymerization by a multistage polymerization method, the component (B1) content being 50 to weight % and the component (B2) content being 50 to 10 weight % (where the sum of components (B1) and (B2) is 100 weight %), and the following conditions (B-1) to (B-3) being satisfied, (B-1) an MFR of 0.1 to 20 g/10 minutes,
(B-2) the relationship between a melt tension (MT) and the MFR satisfying the following formula $$\log MT > -0.97 \times \log MFR + 1.23,$$

(B-3) a longest relaxation time (id) of at least 100 seconds.
   Here, when component (A) is 100 weight % and component (B) is 0 weight %, the propylene-type resin composition (component (A)) then becomes the polypropylene-type resin composition of the present invention.
   A detailed description follows for each of the components constituting the polypropylene-type resin composition of the present invention.

[Component (A)]

Component (A) is a propylene-based resin composition that comprises at least the following two components: a propylene-α-olefin copolymer (component (A1)) satisfying conditions (A-1) to (A-3) below and a propylene homopolymer (component (A2)), and that has a component (A1) content of 1 to 20 weight % and a component (A2) content of 99 to 80 weight % where the sum of components (A1) and (A2) is 100 weight %, components (A1) and (A2) being obtained by polymerization by a multistage polymerization method, this propylene-based resin composition having a melt flow rate in the range from 5 to 20 g/10 minutes, and exhibiting strain hardening in a measurement of extensional viscosity at a temperature of 180° C. and a strain rate of 10 $s^{-1}$.

(A-1) an α-olefin content of 15 to 85 weight % (where the total amount of monomer constituting component (A1) is 100 weight %)

(A-2) an intrinsic viscosity η of 5 to 20 dL/g (A-3) a Mw/Mn of 5 to 15

The propylene-based resin composition (A) that is a constituent of the polypropylene-type resin composition of the present invention is comprised of at least the aforementioned components (A1) and (A2).

The components (A1) and (A2) encompassed by component (A) are described in detail below.

<Component (A1)>

Component (A1) is a propylene-α-olefin copolymer.

The α-olefin here is preferably an alkene having not more than 12 carbons but excluding propylene, and can be exemplified by ethylene, butene, pentene, hexene, heptene, nonene, decene, 1-methylbutene, and 1-methylpentene, whereamong ethylene is particularly preferred.

With regard to the α-olefin content, the α-olefin content using 100 weight % for the total amount of monomer constituting component (A1) is 15 to 85 weight %, wherein the preferred lower limit value can be 16 weight %, 17 weight %, 20 weight %, 30 weight %, or 40 weight %. The preferred upper limit value can be 75 weight %, 60 weight %, 50 weight %, or 45 weight %. These upper and lower limit values may be freely combined. Examples of preferred ranges are 16 to 70 weight %, 17 to 50 weight %, and 40 to 60 weight %.

Component (A1) is effective for suppressing the growth of the foam cells, i.e., for lowering the percentage of coalesced cells, and can ensure the impact resistance of the foam molding, viscosity modification, and ductility during container molding. When the α-olefin content is below the lower limit, the effects of an increased compatibility with component (A2) and a suppression of foam cell growth are diminished. In addition, at above the upper limit, the compatibility with component (A2) conversely ends up deteriorating too much and the interfacial strength between components (A1) and (A2) weakens and the effect of suppressing foam cell growth is diminished.

The intrinsic viscosity η of component (A1) must be 5 to 20 dL/g and is preferably 6.5 to 17 dL/g, 8 to 15 dL/g, or 10 to 20 dL/g. This range is set for the intrinsic viscosity η for the following reasons: since the propylene-α-olefin copolymer inhibits cell growth, a larger molecular weight provides a higher inhibition of tensile deformation of the cell wall, while cell growth is prevented when it is too large.

This intrinsic viscosity is the value measured at a temperature of 135° C. using decalin as the solvent and using a Ubbelohde capillary viscometer. To determine the intrinsic viscosity of component (A1), a small amount of component (A2) is withdrawn during the course of the sequential polymerization and its intrinsic viscosity is measured; the intrinsic viscosity of the overall mass of the components is measured after the completion of the sequential polymerization; and the determination is made using the following formula.

intrinsic viscosity of component (A1)=[intrinsic viscosity of the overall mass of the components–{intrinsic viscosity of component (A2)×weight fraction of component (A2)/100}]/{weight fraction of component (A1)/100}

The Mw/Mn of the propylene-α-olefin copolymer must be 5 to 15 and is preferably 10 to 15. The Mw/Mn is an index of the width of the molecular weight distribution, and, since the propylene-α-olefin copolymer suppresses cell growth, a broader molecular weight distribution more efficiently restrains tensile deformation of the cell wall. Its effects are impaired at 5 or below, while it is quite difficult to produce at 15 or above.

<Component (A2)>

Component (A2) is a propylene homopolymer. The melt flow rate (MFR) for the propylene homopolymer (component (A2)) at a load of 2.16 kg and 230° C. is preferably 2 to 80 g/10 minutes, more preferably 5 to 40 g/10 minutes, and even more preferably 10 to 30 g/10 minutes. When the MFR is in this range, this provides a resin composition that is adapted to high production rates by virtue of the stiffness, impact resistance, and molding temperature of the resin composition.

This MFR is the value measured in accordance with JIS K 7210 at 230° C. under a load of 2.16 kg.

This propylene homopolymer (component (A2)) has a stereoregularity preferably of at least 96% and more preferably of at least 96.5%. When the stereoregularity satisfies this range, the stiffness and heat distortion temperature are further improved and deformation of the molded article during molding is inhibited.

This stereoregularity is the value measured by a $^{13}$C-NMR methodology.

<Composition of Component (A1) and Component (A2)>

The propylene-based resin composition (component (A)) that is a constituent of the polypropylene-based resin composition of the present invention contains 1 to 20 weight %, where the sum of components (A1) and (A2) is 100 weight %, of the propylene-α-olefin copolymer (component (A1)) that satisfies the previously indicated conditions and contains 99 to 80 weight %, where the sum of components (A1) and (A2) is 100 weight %, of the propylene homopolymer that is component (A2).

As previously indicated, component (A1) is a component that has the effect of suppressing foam cell growth, and, in order to maintain excellent mechanical properties and so forth, it must be 1 to 20 weight % and is preferably 3 to 10 weight %. At less than 1 weight %, the inhibitory effect on foam cell growth is reduced and, while the stiffness of the material is raised, the impact resistance is lowered. At greater than 20 weight %, the stiffness is unsatisfactory and the viscosity of the overall resin is raised and little cell nuclei formation occurs, cell growth is hindered, and the expansion ratio is reduced.

The preferred contents for components (A1) and (A2) are 3 to 10 weight % for component (A1) and 97 to 90 weight % for component (A2).

The composition of component (A1) and component (A2) is produced by polymerization by a multistage polymerization method. Production by multistage polymerization can provide a fine dispersion of the propylene-α-olefin copolymer (component (A1)), thereby enabling the appearance of the various properties and hence being preferred.

The molecular weight of the propylene homopolymer must be adjusted to maintain the melt flow rate (MFR, measured at 230° C. under a load of 2.16 kg) of the propylene-based resin composition (component (A)) provided by such a multistage polymerization method at 5 to 20 g/10 minutes and preferably 8 to 15 g/10 minutes. The melt flow rate is a value that affects the moldability and the state of the cells, and, when it is too low, cell growth is hindered and the expansion ratio declines and, in addition, there is little cell nuclei formation and microfine cells are not obtained. When it is high, maintenance of the drawdown during extrusion molding is hindered and molding becomes problematic. Components (A1) and (A2) themselves may be provided by individual single-stage polymerization methods or by a multistage polymerization method.

In order to obtain a microfine closed cell configuration while maintaining an excellent cell growth, the propylene-based resin composition (component (A)) that is a constituent of the polypropylene-based resin composition of the present invention exhibits strain hardening in a measurement of extensional viscosity at a temperature of 180° C. and a strain rate of 10 s$^{-1}$ In particular, the strain hardening exponent λmax (10) measured at a temperature of 180° C. and a strain rate of 10 s$^{-1}$ is preferably at least 1.2 and more preferably is at least 1.8. While there is no rule for the upper limit on λmax (10), it is generally not more than approximately 10.

The method for measuring the strain hardening exponent λmax (10) of the propylene-based resin composition and the polypropylene-based resin composition in the present invention will now be described.

The extensional viscosity at a temperature of 180° C. and a strain rate=10 s$^{-1}$ is plotted on a log-log graph using the time t (s) on the horizontal axis and the extensional viscosity $\eta_E$ (Pa·s) on the vertical axis. The viscosity immediately before the occurrence of strain hardening approximates a straight line on this log-log graph. A commonly used press molder is used for sample production. The temperature of the press molder is set to 190° C. and preheating is first performed for 90 seconds in a state in which pressure is not applied. This is followed by holding for 30 seconds at a pressure of about 30 kg/cm$^2$ for degassing and finally molding by the application of pressure at 100 kg/cm$^2$ for 60 seconds.

The method for analyzing the obtained data will now be considered. Specifically, the slopes at the individual times are first determined when the extensional viscosity is plotted versus time, and various averaging methods may be applied thereto considering that the measurement data for the extensional viscosity is discrete. For example, in one method the slopes for the neighboring data are each determined and a moving average is taken with the surrounding points. In the region of low amounts of strain, the extensional viscosity takes the form of a monotonically increasing relationship and gradually asymptotically approaches a constant value. In the absence of strain hardening, it agrees with the Trouton viscosity after the elapse of a sufficient amount of time. However, when strain hardening is present, the extensional viscosity generally begins to increase with time from a strain amount (=strain rate×time) of about 1. That is, the aforementioned slope presents a diminishing tendency with time in the low strain region, but conversely assumes an increasing tendency from a strain amount of about 1, and an inflection point is present on the curve in the plot of extensional viscosity versus time. When this increase is in fact observed, the assessment is made that strain hardening occurs. Thus, in the strain amount range from about 0.1 to 2.5, the point is determined at which the slopes for the individual times determined as indicated above assume a minimum value; a tangent line is drawn at this point; and the straight line is extrapolated to a strain amount of 4.0. The maximum value (ηmax) of the extensional viscosity $\eta_E$ up to a strain amount of 4.0 is determined, while the viscosity on the above-referenced approximate straight line up to this time is taken to be ηlin. ηmax/ηlin is defined as λmax (10).

The methods for measuring the intrinsic viscosity, molecular weight distribution, and α-olefin content in the propylene-α-olefin copolymer are considered in the following.

1. Analytical Instrumentation Used
   The cross fractionation instrument
      CFC T-100 (abbreviated as "CFC" below) from DIA Instruments Co., Ltd.
   Fourier-transform infrared absorption spectral analysis
      FT-IR, from PerkinElmer Co., Ltd., 1760X
   The fixed-wavelength infrared spectrophotometer attached as the detector for the CFC is removed and the FT-IR is connected in its place and this FT-IR is used as the detector. The transfer line between the FT-IR and the outlet for the solution eluted from the CFC has a length of 1 m, and the temperature is held at 140° C. throughout the measurement period. The flow cell installed at the FT-IR has an optical path length of 1 mm and an optical path width of 5 mmφ, and the temperature is held at 140° C. throughout the measurement period.
   Gel permeation chromatography (abbreviated as "GPC" below)
   Three "AD806MS" (product name, Showa Denko Kabushiki Kaisha) columns connected in series are used as the GPC column in the CFC second stage.

2. CFC Measurement Conditions
   solvent: ortho-dichlorobenzene (ODCB)
   sample concentration: 4 mg/mL
   injection amount: 0.4 mL
   crystallization: temperature dropped from 140° C. to 40° C. over approximately 40 minutes
   fractionation method:
   The fractionation temperatures during temperature-rising elution fractionation are 40, 100, and 140° C., and fractionation into a total of 3 fractions is carried out. The elution percentages (unit: weight %) for the component eluting at less than or equal to 40° C. (fraction 1), the component eluting at 40 to 100° C. (fraction 2), and the component eluting at 100 to 140° C. (fraction 3) are respectively defined as "W40", "W100", and "W140". W40+W100+W140=100. Each of the fractionated fractions is directly and automatically transported to the FT-IR analytical instrument.
   solvent flow rate during elution: 1 mL/minute 3. FT-IR Measurement Conditions
   After elution of the sample solution from the GPC of the CFC second stage has begun, FT-IR measurement using the conditions indicated below is performed and the GPC-IR data for each of the above-described fractions 1 to 3 is acquired.
   A schematic diagram of the CFC-FT-IR system structure is given in FIG. 1.
   detector: MCT
   resolution: 8 cm$^{-1}$
   measurement interval: 0.2 min (12 seconds)
   number of scans per measurement: 15

4. Postprocessing and Analysis of the Measurement Results

The elution amount and molecular weight distribution for the components eluted at each temperature are determined using the absorbance at 2945 cm$^{-1}$ obtained by FT-IR for the chromatogram. The elution amounts are normalized by having the total of the elution amounts for the individual eluted components be 100%. The conversion from retention volume to molecular weight is performed using a preliminarily constructed calibration curve obtained using standard polystyrene. The specific methodology is the same as described above.

The ethylene content distribution of each eluted component (the distribution of the ethylene content along the molecular weight axis) is determined using the ratio between the absorbance at 2956 cm$^{-1}$ and the absorbance at 2927 cm$^{-1}$ obtained by the GPC-IR and converting to the ethylene content (weight %) using a calibration curve constructed in advance using polyethylene, polypropylene, ethylene-propylene rubber (EPR) having a known ethylene content provided by, for example, $^{13}$C-NMR measurement, and their mixtures.

<Content of the Propylene-α-Olefin Copolymer>

Using a propylene-ethylene copolymer (referred to below as "EP"), in which the α-olefin is ethylene, as the example for the purposes of the explanation, the content of the propylene-α-olefin copolymer (component (A1)) in the polypropylene-based resin composition in the present invention is defined by the following formula (I) and is determined by the procedure described below.

$$\text{EP content (weight \%)} = W40 \times A40/B40 + W100 \times A100/B100 + W140 \times A140/B140 \quad (I)$$

In formula (I), W40, W100, and W140 are the elution percentages (unit: weight %) for the individual fractions that have been described above; A40, A100, and A140 are the average ethylene contents (unit: weight %) actually measured for each of the fractions corresponding to W40, W100, and W140; and B40, B100, and B140 are the ethylene contents (unit: weight %) of the propylene-ethylene copolymers present in each fraction. The procedures for determining A40, A100, A140, B40, B100, and B140 are described below.

The meaning of formula (I) is as follows.

The first term on the right-hand side of formula (I) is a term that calculates the amount of EP contained in fraction 1 (portion soluble at 40° C.). When fraction 1 contains only EP and does not contain a propylene homopolymer (referred to below as "PP"), W40 contributes to the EP content of fraction 1 origin what it accounts for in the whole as such; however, the presence in fraction 1, in addition to the EP-originating component, of a small amount of a PP-originating component (component having a very small molecular weight and atactic polypropylene) requires correction for this portion. Thus, the EP component-originating amount in fraction 1 is calculated by multiplying W40 by A40/B40. For example, when the average ethylene content (A40) in fraction 1 is 30 weight % and the ethylene content (B40) of the EP present in fraction 1 is 40 weight %, ³⁰⁄₄₀=¾ (i.e., 75 weight %) for fraction 1 originates from EP and the remaining ¼ originates from PP. This step of multiplying by A40/B40 in the first term on the right-hand side represents the calculation of the EP contribution from the weight % of fraction 1 (W40). This is also the same for the second and following terms on the right-hand side, and the EP content is obtained by calculating the EP from each individual fraction and summing these.

(1) As indicated above, the average ethylene content for the fractions 1 to 3 obtained by the CFC measurement is labeled, respectively, A40, A100, and A140 (the unit is weight % for all of these). The procedure for determining the average ethylene content is described below.

(2) The ethylene content corresponding to the peak location in the differential molecular weight distribution curve of fraction 1 is indicated by B40 (unit: weight %). With regard to fractions 2 and 3, it is thought that the rubber portion elutes completely at 40° C. and designation by the same definition is not possible, and B100 =B140 =100 is therefore defined for the present invention. B40, B100, and B140 are the ethylene contents of the EP present in the individual fractions, but an analytical determination of these values is substantially impossible. The reason for this is that no means exists for completely separating fractionating the PP and EP commingled in a fraction. As a result of investigations using various model samples, it was found that the improvements in the material properties could be well accounted for by having B40 be the ethylene content corresponding to the peak location in the differential molecular weight distribution curve for fraction 1. In addition, for the following 2 reasons, approximating both B100 and B140 with 100 approximates the actual situation and produces almost no error in the calculations: the presence of the crystallinity originating with the ethylene chain, and the amount of EP present in these fractions is relatively small in comparison to the amount of EP present in fraction 1. The analysis is therefore carried out using B100=B140=100.

(3) The EP content is determined according to the following formula (II).

$$\text{EP content (weight \%)} = W40 \times A40/B40 + W100 \times A100/100 + W140 \times A140/100 \quad (II)$$

W40×A40/B40, which is the first term on the right-hand side of formula (II), represents the crystallinity-free EP content (weight %), while W100×A100/100+W140×A140/100, which is the sum of the second and third terms, represents the crystallinity-containing EP content (weight %).

This A40, A100, and A140—which are the average ethylene contents of the individual fractions 1 to 3 yielded by the CFC measurement—and B40 are determined as follows.

The following are determined for the fraction 1 fractionated based on differences in the crystal distribution: a curve provided by measuring the molecular weight distribution with the GPC column that is a part of the CFC analytical instrument, and an ethylene content distribution curve measured in correspondence to the molecular weight distribution curve, by the FT-IR connected after the GPC column. The ethylene content corresponding to the peak position in the differential molecular weight distribution curve is taken to be B40.

In addition, the overall sum of the products of the weight % at each individual data point and the ethylene content for each individual data point, which are acquired as data points during the measurement, is taken to be the average ethylene content A40.

The significance of the three fractionation temperatures is as follows. The significance of the 40° C. in this CFC analysis is that this is the necessary and sufficient temperature condition for the fractionation of only crystallinity-free polymer (for example, the majority of the EP, or, within the PP, the component having a very low molecular weight and the atactic component). The significance of the 100° C. is that this is the necessary and sufficient temperature for eluting only the component that is insoluble at 40° C. but soluble at 100° C. (for example, the low-crystallinity PP and, within the EP, the component having crystallinity that originates in ethylene and/or propylene chains). The significance of the 140° C. is that this is the necessary and sufficient temperature for eluting only the component that is insoluble at 100° C. but soluble at 140° C. (for example, within the PP, the component that has a particularly high crystallinity, and, within the EP, the component that has a very high molecular weight and ethylene crystallinity) and for recovering the entire amount of the propylene-based block copolymer used in the analysis. The EP component in W140 is very small and can substantially be neglected.

$$\text{ethylene content in the EP (weight \%)} = (W40 \times A40 + W100 \times A100 + W140 \times A140) / [EP] \quad \text{(III)}$$

This [EP] is the previously determined EP content (weight %).

Within the EP, the ethylene content (E) (weight %) of the crystallinity-free portion is approximated by the value of B40 because the elution of the rubber portion is almost entirely complete at less than or equal to 40° C.

However, in an analytical method that combines the cross fractionation technique described above with FT-IR, an accurate analysis becomes problematic in those instances in which the ethylene content in component (A1) is less than 15 weight % and a large difference in crystallinity with component (A2) is not present and a temperature-based fractionation cannot then be satisfactorily carried out. In such a case, preferably component (A1) is withdrawn during the course of the sequential polymerization and its molecular weight is measured (the comonomer content is also measured when a comonomer is copolymerized); the quantitative ratio between component (A1) and component (A2) is determined, for example, by a material balance-based calculation or a direct weighing of the weights during the course of the sequential polymerization; and the comonomer content of component (A1) is also determined by measuring the α-olefin content of the overall component (A) upon completion of the sequential polymerization and using the following simple addition rule for the weights. The ethylene content of (A1) can be determined using the following formula when ethylene is used as the comonomer.

$$\text{ethylene content of component } (A1) = [\text{ethylene content of the total mass} - \{\text{ethylene content of component } (A1) \times \text{weight fraction of component } (A1)/100\}] / \{\text{weight fraction of component } (A2)/100\}$$

With regard to the quantitative ratio between component (A1) and component (A2), this can also be determined—when a production is carried out that provides a certain difference between the average molecular weights of components (A1) and (A2)—by carrying out a GPC measurement on the total mass after the completion of the sequential polymerization; running a peak separation on the obtained multimodal molecular weight distribution curve using, for example, a commercially available data analysis software; and calculating their weight ratio.

After the amount of component (A2) has been determined proceeding as described, the intrinsic viscosity of component (A2) can be determined using the following formula from the amount of component (A2), the intrinsic viscosity of component (A1) provided by sampling and assessment during the course of polymerization, and the intrinsic viscosity of the total mass (Y).

$$\text{intrinsic viscosity of component } (A1) = [\text{intrinsic viscosity of the total mass } (Y) - \{\text{intrinsic viscosity of component } (A2) \times \text{weight fraction of component } (A2)/100\}] / \{\text{weight fraction of component } (A1)/100\}$$

<Production Method>

The production of the propylene-based resin composition that is component (A) is carried out using a multistage polymerization method, but there are no particular limitations thereon as long as the hereinabove described properties are present, and an appropriate selection may be made from known multistage polymerization methods and conditions.

A highly stereoregular catalyst is ordinarily used as the propylene polymerization catalyst. For example, Ziegler catalysts are preferred, such as catalysts that combine an organoaluminum compound and an aromatic carboxylic acid ester with a titanium trichloride composition obtained by reducing titanium tetrachloride with an organoaluminum compound followed by treatment with various electron donors and electron acceptors (refer to Japanese Patent Application Laid-open Nos. S56-100806, S56-120712, and S58-104907) and supported catalysts provided by contacting a magnesium halide with titanium tetrachloride and various electron donors (refer to Japanese Patent Application Laid-open Nos. S57-63310, S63-43915, and S63-83116).

The propylene-based resin composition is obtained by the polymerization of propylene followed by the random polymerization of propylene and an α-olefin, particularly preferably ethylene, in the presence of a polymerization catalyst using a production process such as, for example, a gas-phase polymerization method, liquid-phase bulk polymerization method, or slurry polymerization method. Multistage polymerization by a slurry method or a gas-phase fluidized bed method is preferred for obtaining a propylene-based resin composition (component (A)) that has the various properties described in the preceding.

The polymerization to give the propylene homopolymer (component (A2)) may be a single-stage polymerization or multistage polymerization of propylene.

The multistage polymerization to give the propylene homopolymer can be exemplified by the following two-stage polymerization method having a step (1) and a step (2).

Step (1):

The propylene is polymerized in the presence of hydrogen as a molecular weight regulator in order to suppress the production of polymer with an excessively large molecular weight. Hydrogen is added so as to provide an MFR for the propylene polymer portion of preferably at least 150 g/10 minutes. The hydrogen concentration is generally selected from the range of 0.1 to 40 mol % with reference to the total amount of monomer. The polymerization temperature is generally selected from 40 to 90° C. and the pressure is generally selected from 0.1 to 5 MPa. The amount of polymer obtained in this step (1) is preferably adjusted to provide generally from 80 to 99 weight % of the total amount of polymerization. When the amount of the propylene polymer produced in this step (1) is less than 80 weight %, the high molecular weight propylene polymer produced in step (2) becomes too prominent and the moldability is then readily impaired.

Step (2):

In order to carry out polymerization into a propylene polymer having a higher molecular weight than the propylene polymer produced in step (1), the polymerization in step (2) is carried out in an atmosphere that has a hydrogen concentration that is as low as possible or is carried out under conditions in which hydrogen is substantially not present. The polymerization is run successively in the presence of the propylene polymer produced in step (1) and a catalyst. The polymerization temperature is generally selected from the range of 40 to 90° C. and the pressure is generally selected from the range of 0.1 to 5 MPa. The amount of polymer obtained in this step (2) is generally preferably adjusted to provide 1 to 20 weight % of the total amount of polymerization. Any combination may be used as long as the property values of the overall polymer yielded by the combination of step (1) and step (2) can be brought into the previously described ranges.

The polymerization to give the propylene homopolymer (component (A2)) portion is followed by polymerization to give the propylene-α-olefin copolymer (component (A1)) portion. The propylene-α-olefin copolymer portion must be executed as a high molecular weight propylene-α-olefin copolymer in order to bring the intrinsic viscosity and molecular weight distribution (Mw/Mn) to the prescribed values.

In order to carry out polymerization into a high molecular weight polymer, the polymerization to give the propylene-α-olefin copolymer portion preferably is carried out in an atmosphere that has a hydrogen concentration that is as low as possible or is carried out under conditions in which hydrogen is substantially not present. The polymerization is run successively and in the presence of a catalyst and the propylene homopolymer produced in the polymerization step for the propylene homopolymer. The polymerization temperature is generally selected from the range of 40 to 90° C. and the pressure is generally selected from the range of 0.1 to 5 MPa.

[Component (B)]

Component (B) is a propylene-based resin composition that is constituted of components (B1) and (B2) that satisfy the following and are obtained by a multistage polymerization method.

Component (B1):

A propylene homopolymer or a propylene-α-olefin copolymer having a non-propylene α-olefin content of less than 1 weight %, which has an MFR of 10 to 1,000 g/10 minutes.

Component (B2):

A propylene-α-olefin copolymer having a weight-average molecular weight of 500,000 to 10,000,000 and a non-propylene α-olefin content of 1 to 15 weight %.

In addition, component (B) is a propylene-based resin composition that has a component (B1) content of 50 to 90 weight % and a component (B2) content of 50 to 10 weight % (where the sum of components (B1) and (B2) is 100 weight %) and that satisfies the following conditions (B-1) to (B-3).

(B-1) an MFR of 0.1 to 20 g/10 minutes (B-2) the relationship between the melt tension (MT) and the MFR satisfying the following formula $$\log MT > -0.97 \times \log MFR + 1.23$$

(B-3) a longest relaxation time ($\tau d$) of at least 100 seconds

A catalytic system composed mainly of a titanium-containing solid catalyst component and an organoaluminum compound, or a metallocene transition metal compound that has at least one conjugated π-electron ligand, can be used as the catalytic system for obtaining the propylene-based resin composition having the indicated properties (component (B)).

The metallocene compound may also be used with an aluminoxane as a cocatalyst and may be used supported on silica or a clay mineral. Preferred specific examples of metallocene catalysts are the catalysts described in Japanese Patent Application Laid-open Nos. H8-217928, H8-238731, H8-183814, H8-208733, H8-85707 and the like.

The titanium-containing solid catalyst component is selected from known supported catalyst components obtained by contacting a solid magnesium compound, a titanium tetrahalide, and an electron donor compound and from known catalyst components that contain titanium trichloride as their main component.

The aluminum compound for the cocatalyst is represented by the general formula $AlR_nX_{3-n}$ (in the formula, R represents a $C_{2-10}$ hydrocarbyl group, X represents a halogen atom such as chlorine, and n represents a number defined by $3 \geq n > 1.5$).

When the titanium-containing solid catalyst component is a support-supported catalyst component that contains a solid magnesium compound, the use of $AlR_3$ or a mixture of $AlR_3$ and $AlR_2X$ is preferred. When, on the other hand, it is a catalyst component that contains titanium trichloride or contains titanium trichloride as its main component, the use of $AlR_2X$ is preferred.

Known electron donor compounds can be used as the third component in addition to these catalysts and cocatalyst components.

The polymerization reaction to obtain the propylene-based resin composition (component (B)) can be run, for example, in the presence of an inert solvent, e.g., hexane or heptane, or in the absence thereof, i.e., in the presence of liquid propylene or in gas-phase propylene. The reaction can be run in batch mode using one polymerization kettle or can be run continuously by connecting two or more polymerization kettles in series. With regard to the polymerization sequence, a two-stage execution is preferred in which the polymerization to give component (B1) is carried out initially followed by the polymerization to give component (B2). Additional polymerizations in three stages or four stages may also be carried out.

The catalyst is generally added prior to the polymerization in the first stage. Replenishment of the catalyst in an ensuing stage is not necessarily ruled out, but the addition of catalyst in the first stage is preferred in order to obtain properties not obtained with a resin blend.

The additional α-olefin that is copolymerized with propylene can be specifically exemplified by ethylene, 1-butene, 1-hexene, 1-octene, and so forth, wherein ethylene is particularly preferred.

A two-stage method in which polymerization to give component (B1) is performed initially followed by polymerization to give component (B2) is described in detail in the following.

In a step (1) for obtaining component (B1), the polymerization of propylene or propylene and a small amount of another olefin is carried out in the presence of hydrogen. The hydrogen preferably controls the MFR of the polymer yielded by step (1) into the range from 10 to 1000 g/10 minutes. At an MFR of 10 or below, the viscosity of the total mass ends up being reduced and microfine cells are then not obtained; at above 1000, the cell growth inhibiting effect is diminished and an undesirable open cell state occurs. The hydrogen concentration (denotes the gas-phase concentration in a slurry polymerization, the content in the monomer in polymerization in liquid propylene, and the content in the monomer in a gas-phase method) is generally an addition at 1 to 50 mol % and preferably 3 to 30 mol %. The other olefin that is copolymerized with the propylene may be added intermittently or may be supplied continuously, for example, with the propylene. The polymerization temperature in step (1) is generally 40 to 90° C., and from 50 to 90 weight % and preferably 60 to 80 weight % of the overall amount of polymerization is produced.

The step (2) for obtaining component (B2) is a polymerization in order to obtain a high molecular weight component, and this polymerization is run in a substantially hydrogen-free state in which the hydrogen concentration is not more than 0.1 mol %. The weight-average molecular weight of the polymer obtained in step (2) is 500,000 to 10,000,000 and preferably 800,000 to 5,000,000. At a weight-average molecular weight of 500,000 or below, the effect of raising the melt tension is diminished, the inhibitory effect on cell growth is diminished, and an open cell state occurs, and hence this is undesirable. When, on the other hand, 10,000,000 is exceeded, the viscosity of the total mass ends up declining and microfine cells are not obtained. The polymerization temperature is generally 40 to 90° C. and is preferably 50 to 80° C., while the α-olefin used as the copolymerized comonomer is specifically selected from, for example, ethylene, 1-butene, 1-hexene, and 1-octene, wherein ethylene is particularly preferred. The content of the α-olefin is 1 to 15 weight % and preferably 3 to 10 weight %. When the comonomer content is too high or too low, the dispersion of the high molecular weight component deteriorates and the effect of improving the melt tension declines.

The polymer obtained in step (2) is 10 to 50 weight % and preferably 20 to 40 weight % of the total polymer that is polymerized to give component B. At less than 10 weight %, the effect of boosting the melt tension is diminished and the effect of suppressing cell growth is diminished and an open cell state appears, and hence this is undesirable. At above 50 weight %, the viscosity of the total mass ends up declining and microfine cells are not obtained.

For the weight-average molecular weight, the polymer obtained after the completion of the front-stage polymerization and the final polymer are both measured using GPC, and the weight-average molecular weight can be calculated from the difference between the two and the relationship between the amount of the polymer from the front-stage polymerization and the amount of the final polymer. The MFR of the final polymer yielded by step (1) and step (2) is preferably 0.1 to 20 g/10 minutes and is more preferably 0.5 to 10 g/10 minutes.

The details for this derivation of the weight-average molecular weight using GPC are described in the following. The following method was used for this example. instrument model used: 150 C from the Waters Corporation measurement temperature: 140° C.
solvent: orthodichlorobenzene (ODCB)
column: 2×Shodex 80M/S from Showa Denko Kabushiki Kaisha
flow rate: 1.0 mL/minute
injection amount: 0.2 mL
sample preparation: For the sample, a 1 mg/mL solution is prepared using ODCB (containing 0.5 mg/mL 2,6-di-t-butyl-4-methylphenol (BHT)), with dissolution requiring approximately 1 hour at 140° C.
molecular weight determination: standard polystyrene method The conversion from retention volume to molecular weight is carried out using a calibration curve that has been constructed in advance using standard polystyrene. The following commercial products, all from Tosoh Corporation, are used for the standard polystyrene.

F380, F288, F128, F80, F40, F20, F10, F4, F1, A5000, A2500, A1000

The calibration curve is constructed by injecting 0.2 mL of each of the solutions prepared by dissolution in ODCB (containing 0.5 mg/mL BHT) to give 0.5 mg/mL. A cubic expression obtained by approximation by the least squares method is used for the calibration curve.

The following numerical values are used for the viscosity expression $[\eta]=K \times M^\alpha$ used for the conversion to molecular weight.
PS: $K=1.38 \times 10^{-4}$, $\alpha=0.7$
PE: $K=3.92 \times 10^{-4}$, $\alpha=0.733$
PP: $K=1.03 \times 10^{-4}$, $\alpha=0.78$
detector: MIRAN 1A IR detector (measurement wavelength: 3.42 μm) from FOXBORO.
column: AD806M/S (3 columns) from Showa Denko Kabushiki Kaisha The following relationship between the melt tension (MT) and the MFR also characteristically obtains for the propylene-based resin composition (component (B)).

$$\log MT > -0.97 \times \log MFR + 1.23$$

This relationship represents the balance between the melt tension and the fluidity. When this formula is satisfied, this corresponds to the presence of an excellent fluidity and excellent extrusion characteristics while at the same time a high melt tension is generated. That is, the propylene-based resin composition (component (B)) then presents an excellent balance between the extrusion characteristics and the processing characteristics, e.g., in blow molding, foam molding, thermoforming, and so forth.

On the other hand, conventional general-purpose polypropylene-based resin compositions exhibit left-hand side<right-hand side in the preceding formula, and the fluidity is then worsened because the MFR is smaller at the same MT when compared to the propylene-based resin composition (component (B)).

Here, the method for measuring the melt tension MT in this example used a Capilograph from Toyo Seiki Seisakusho Ltd., and the measurement was performed under conditions of a cylinder temperature of 190° C., an orifice L/D=8.1/2.095 (mm), a piston speed of 10 mm/min, and a take-off speed of 3.9 m/min.

The production of a propylene-based resin composition (component (B)) that satisfies the preceding relationship can be achieved by the previously described polymerization method, and production can be particularly preferably carried out by bringing component (B2) to 50 to 10 weight % and preferably 40 to 20 weight % and by bringing the weight-average molecular weight of component (B1) to 500,000 to 10,000,000 and preferably approximately 500,000 to 5,000,000.

Another characteristic feature of the propylene-based resin composition (component (B)) is that its longest relaxation time (τd) is at least 100 seconds. This τd is determined by stress relaxation measurements and denotes the time until return to a random state prior to deformation via an orientational relaxation in which molecular chains that have been subjected to deformation relax without a change in orientation. This τd is considered to be closely connected to the processing characteristics in, e.g., blow molding, foam molding, thermoforming, and so forth, and a larger τd is believed to correlate with better processing characteristics. τd is seen to undergo extension due to either a high molecular weight component or a branched component or due to the presence of both, but does not necessarily agree with the nonlinearity of the extensional viscosity. That is, τd does not govern the nonlinearity of the extensional viscosity, but does govern the uniform ductility during extensional deformation. According to the results of investigations by the present inventors, the processing characteristics are hindered when τd is less than 100 seconds due to the small contribution from long-relaxation-time components. That is, satisfying τd≥100 seconds is an essential condition for molding processes where a high melt tension is required.

For this longest relaxation time (τd), in this example a master curve is constructed by measuring the relaxation modulus G(t) using an RMS-800 Mechanical Spectrometer from Rheometrics, Inc., and using parallel plates with a diameter of 25 mm and a gap of 1.5 mm at temperatures of 200° C. and 240° C. and strains of 50 and 100%. Using the obtained G(t), τd was calculated according to the method described in *Journal of Polymer Science*, Volume XL, pp. 443-456 (1959).

The production of a propylene-based resin composition (component (B)) that has a longest relaxation time (id) of at least 100 seconds can be carried out by the previously described polymerization method, and production can be particularly preferably carried out by bringing component (B2) to 50 to 10 weight % and preferably 40 to 20 weight % and by bringing the weight-average molecular weight of component (B1) to 500,000 to 10,000,000 and preferably approximately 500,000 to 5,000,000.

[The Polypropylene-Based Resin Composition Comprising Components (A) and (B)]

The components (A) and (B) obtained as described above form a polypropylene-based resin composition well adapted for foaming, by formulation at a quantitative ratio, based on 100 weight % for the sum of components (A) and (B), wherein component (A) is 100 weight % or is less than 100 weight % but at least 70 weight % and component (B) is 0 weight % or is greater than 0 weight % but not more than 30 weight %. Component (A) is the component critical for microfine-sizing of the cells, maintaining the appearance of the extrusion foam article, and securing the fluidity, impact resistance, and stiffness of the composition as a whole, while component (B) is critical as the component that imparts the melt tension required for cell inhibition and that brings about additional improvements in the drawdown during thermoforming and blow molding. At not more than 70% component (A), a foam article with an excellent appearance is not obtained and the cells become coarse and the impact resistance also deteriorates.

For the case in which component (B) is an essential component, the range in which the effects of component (B) are satisfactorily manifested is preferably 97 to 70 weight % component (A) and 3 to 30 weight % component (B), while a more preferred quantitative ratio is 96 to 70 weight % component (A) and 4 to 30 weight % component (B) and more preferably 95 to 80 weight % component (A) and 5 to 20 weight % component (B).

<Additives>

The polypropylene-based resin composition of the present invention may as necessary incorporate the auxiliary additive components ordinarily used in polyolefin, for example, antioxidants, neutralizing agents, heat stabilizers, light stabilizers, ultraviolet absorbers, anti-fogging agents, agents that increase crystallization nuclei, slip agents, antiblocking agents, antiseptics, colorants, flame retardants, and so forth.

A filler may also be added. With regard to its type, it may be an inorganic filler or an organic filler. The inorganic fillers can be exemplified by talc, calcium carbonate, silica, diatomaceous earth, alumina, titanium oxide, magnesium oxide, aluminum hydroxide, magnesium hydroxide, calcium silicate, glass beads, bentonite, glass flake, glass fiber, carbon fiber, aluminum powder, molybdenum sulfide, boron fiber, potassium titanate, calcium titanate, hydrotalcite, pumice powder, mica, calcium phosphate, and aluminum phosphate, while the organic fillers can be exemplified by PMMA beads, cellulosic fiber, polyamide fiber, aramid fiber, polyester fiber, rice husks, wood powder, tofu lees, tapioca powder, rice flour, kenaf fiber, starch powder, and paper powder.

In addition, the following may also be incorporated within a range that does not impair the effects of the present invention: a diluent or the pulverizate of a skeleton or the edge loss produced when a foam molding is obtained from the polypropylene-based resin composition of the present invention, e.g., homopolypropylene, random copolymers of propylene with ethylene or α-olefin having 4 or more carbons, and block copolymers of propylene with ethylene or α-olefin having 4 or more carbons, and/or, for the purposes of modification as necessary, an elastomer such as ethylene-propylene rubber, ethylene-propylene-diene rubber, high-density polyethylene, low-density polyethylene, linear low-density polyethylene, a styrenic elastomer, and so forth, a petroleum resin or cycloolefin resin, a polyethylene wax or petroleum wax, or a different resin, e.g., an ethylene-vinyl acetate copolymer, maleic acid-modified polypropylene, ethylene-vinyl alcohol copolymer, polyethylene terephthalate, polystyrene, ABS resin, and so forth.

The index for their addition is preferably such that the amount of addition is controlled that a total content of the component (A1) propylene-α-olefin copolymer is maintained in the range of 1 to 20 weight %.

In order to obtain a polypropylene-based resin foam molding using the polypropylene-based resin composition of the present invention, the use is preferred of a method in which a foaming agent is added to and melt-mixed into this resin material in an extruder.

For example, an inorganic foaming agent, a volatile foaming agent, or a decomposable foaming agent can be used as the foaming agent, and these can also be used in the form of a mixture. The inorganic foaming agent can be exemplified by carbon dioxide, air, nitrogen, and so forth. The volatile foaming agent can be exemplified by aliphatic hydrocarbons and alicyclic hydrocarbons such as propane, butane, pentane, hexane, cyclobutane, and cyclopentane, and by halogenated hydrocarbons such as monochlorodifluoromethane, trichlorofluoromethane, dichlorodifluoromethane, dichlorotetrafluoroethane, methyl chloride, ethyl chloride, and methylene chloride. The decomposable foaming agent can be exemplified by azodicarbonamide, dinitrosopentamethylenetetramine, azobisisobutyronitrile, p,p'-oxybisbenzenesulfonyl hydrazide, citric acid, and sodium bicarbonate.

While the amount of addition of the foaming agent to the polypropylene-based resin composition will vary as a function of the type of foaming agent, the equipment, the operating conditions, the expansion ratio for the product, and so forth, the addition of 1 to 10 weight parts per 100 weight parts of the polypropylene-based resin composition is preferred in order to obtain a foam sheet having an expansion ratio of 2 to 8 times (foam density of 0.11 to 0.46 g/cm$^3$). A material adapted for foaming must be a material that can yield a suitable expansion ratio at a suitable amount of gas.

The values of the open cell percentage and the closed cell percentage are an index for representing the state of the foam. In particular, the open cell percentage is not more than 30% and preferably not more than 15% when the foam sheet is subjected to secondary processing. At above 30%, cell expansion during secondary heating exercises a substantial influence on the surface and readily influences container appearance.

Moreover, in order to provide a smooth appearance and provide secondary moldability, e.g., container molding, a nonfoam layer comprising a thermoplastic resin composition may be co-extruded with the polypropylene-based resin foam sheet. A known method may be used as the co-extrusion method, and examples in this regard are multi-manifold procedures in which lamination is performed within the die, and feed block procedures (combining adapter procedures) in which lamination is performed immediately before inflow into the die.

The thermoplastic resin composition constituting the nonfoam layer can be exemplified by high-density polyethylene, low-density polyethylene, linear low-density polyethylene, homopolypropylene, random copolymers of propylene with ethylene or α-olefin having 4 or more carbons, block copolymers of propylene with ethylene or α-olefin having 4 or more carbons, ethylene-propylene rubber, and ethylene-propylene-diene rubber. However, viewed in terms of the affinity with the foam layer and the co-extrusion characteristics, high-density polyethylene, low-density polyethylene, linear low-density polyethylene, homopolypropylene, propylene-ethylene block copolymers, propylene-ethylene random copolymers, and mixtures of the preceding are preferred. Viewed in terms of restraining heat generation during extrusion, homopolypropylene, propylene-ethylene block copolymers, propylene-ethylene random copolymers, and their mixtures are more preferred.

The auxiliary additive components commonly used in polyolefins, e.g., antioxidants, neutralizing agents, heat stabilizers, light stabilizers, ultraviolet absorbers, anti-fogging agents, slip agents, antiblocking agents, antiseptics, colorants, flame retardants, and so forth, can as necessary be incorporated into the nonfoam layer. An inorganic or organic filler may also be added, wherein the inorganic filler can be exemplified by talc, calcium carbonate, silica, diatomaceous earth, alumina, titanium oxide, magnesium oxide, aluminum hydroxide, magnesium hydroxide, calcium silicate, glass beads, bentonite, glass flake, glass fiber, carbon fiber, aluminum powder, molybdenum sulfide, boron fiber, potassium titanate, calcium titanate, hydrotalcite, carbon fiber, pumice powder, mica, calcium phosphate, and aluminum phosphate, and the organic filler can be exemplified by polymethyl methacrylate resin beads, cellulosic fiber, polyamide fiber, aramid fiber, polyester fiber, rice husks, wood powder, tofu lees, tapioca powder, rice flour, and kenaf fiber.

The polypropylene-based resin foam molding constituted as described above can be obtained in the form of a polypropylene-based resin foam sheet by attaching a slit die or circular die to the extruder itself for extruding the foaming agent-containing polypropylene-based resin composition and carrying out extrusion from the slit die (T-die or coat hanger type) or circular die.

The expansion ratio of the foam sheet is preferably approximately 1.5 to 30 times. The thickness of the foam sheet is not particularly limited, but is preferably approximately 0.3 mm to 10 mm and more preferably is 0.5 mm to 5 mm.

The average cell diameter of the foam sheet is preferably not more than 300 μm, more preferably not more than 200 μm, and even more preferably not more than 100 μm. When this average cell diameter is larger than 300 μm, appearance defects, e.g., perforations and so forth, are produced in the polypropylene-based foam sheet or the thermoformed article provided by thermoforming this sheet, and hence this is disfavored. The open cell percentage is preferably not more than 30%, more preferably not more than 20%, and even more preferably not more than 15%.

Diverse variations of the nonfoam layer may be provided as the nonfoam layer used in addition to the foam layer, for example, 1) nonfoam layers having different formulations, e.g., different pigments and so forth, may be laminated on the top and back sides; 2) the nonfoam layer may be divided into a plurality of layers in order to provide a barrier layer and an adhesive layer; and 3) the foam layer may be divided into two layers and another layer may be provided as a central layer.

The thickness of the multilayer foam sheet is not particularly limited, but approximately 0.3 mm to 10 mm is preferred and 0.5 mm to 5 mm is more preferred.

The single-layer or multilayer foam sheet extruded from the die is then cooled and solidified by a known method, for example, using a polishing roll, air knife, or mandrel, and is subsequently taken up to a take-up device or cut to pre-scribed dimensions using a cutter. The post-processing that follows cooling and solidification is not particularly limited, and the following, for example, can be used: a treatment process that provides polar groups, e.g., a corona treatment, flame treatment, plasma treatment, and so forth; a coating step, e.g., applying an anti-fogging agent or an antistatic agent, using a coater roll; as well as, for example, attaching a film, printing, painting, and so forth.

In particular, film attachment can be carried out by a method that uses a pre-thermoforming lamination technique in which attachment is performed prior to secondary molding or that uses a thermal lamination technique in which attachment is performed during cooling during foam laminated sheet molding, wherein the foam laminated sheet is subjected to an interim cooling followed by reheating with, for example, a hot roll, to effect attachment; however, attachment may be carried out by any known method.

The type of attached film is also not particularly limited and can be exemplified by films provided by the lamination of cast polypropylene (CPP) film and printed films therefrom, ethylene-vinyl alcohol copolymer (EVOH) films, and so forth, but the use is preferred of a film that readily adheres with polyolefin and has a polyolefin-based resin disposed on the attachment side, or a film coated with, e.g., an ink or adhesive, in which a chlorinated polypropylene or low molecular weight polyolefin is mixed.

The foam sheet of the present invention is very well adapted to secondary molding into moldings such as containers. The molding technique used in the secondary molding can be, for example, a vacuum pressure molding technique, a vacuum molding technique, a plug molding technique, a press molding technique, dual-side vacuum molding, and so forth, according to any known general method.

In the present invention, molding by a blow molding technique can be carried out on the resin that, either by itself or in a laminated configuration, has been extruded to give a parison. There are no particular limitations on the method for executing this blow molding, but a method is generally used in which a hollow molded article of the polypropylene-based resin foam is obtained using, for example, a direct blow molder or an accumulation-type blow molder.

The molded articles obtained by such molding methods can be used in a wide range of fields, e.g., for stationery files, food containers, beverage cups, display cases, auto parts, commercial and industrial components, and trays.

EXAMPLES

The present invention is specifically described herebelow by examples, but the present invention is not limited to or by these examples.

The properties of the polypropylene-based (multilayer) foam sheet and its constituent components were measured and assessed in the examples and comparative examples according to assessment methods described below. The resins used are also described below.

1. Property Assessments
(1) MFR (unit: g/10 minutes):
This was measured according to the appendix in JIS-K 6921-2. The measurement was performed under the following conditions: temperature of 230° C. and load of 21.18 N.
(2) Methods for measuring the intrinsic viscosity, molecular weight distribution, content, and α-olefin content for components (A1), (B1), and (B2): these measurements were carried out by the previously described methods.
(3) Method for measuring the strain hardening exponent λmax (10)
This was derived by the previously described method using the instrumentation and conditions indicated below.
(a) instrumentation: "Ares" from Rheometrics, Inc.
(b) fixture: "Extensional Viscosity Fixture" from TA Instruments
(c) test temperature: 180° C.
(d) strain rate: 10/sec
(e) sample test piece: 15 mm×10 mm press-molded sheet with a thickness of 0.5 mm 2. Materials Used (Material A-1)
1. Preparation of the Solid Catalyst Component (c)

20 L of dried and deoxygenated n-heptane was introduced into a 50-L stirrer-equipped tank that had been thoroughly substituted with nitrogen. This was followed by the introduction of 10 mol $MgCl_2$ and 20 mol $Ti(O-n-C_4H_9)_4$ and reaction for 2 hours at 95° C. After the completion of the reaction, the temperature was dropped to 40° C. and 12 L of methylhydropolysiloxane (20 cSt) was then introduced and a reaction was run for 3 hours. The produced solid component was washed with n-heptane.

Then, using the aforementioned stirrer-equipped tank, 5 L of n-heptane that had been purified as described above was introduced into this tank and 3 mol, as the Mg atom, of the solid component synthesized as described above was introduced. Then, 5 mol $SiCl_4$ in 2.5 L n-heptane was mixed and this was introduced into the tank over 30 minutes at 30° C. and a reaction was carried out for 3 hours at 70° C. Washing with n-heptane was performed after the completion of the reaction.

2.5 L n-heptane was then introduced into the aforementioned stirrer-equipped tank; 0.3 mol phthaloyl chloride was mixed; introduction was carried out over 30 minutes at 70° C.; and a reaction was run for 1 hour at 90° C. Washing with n-heptane was performed after the completion of the reaction. Then, 2 L $TiCl_4$ was introduced and a reaction was run for 3 hours at 110° C. After the completion of the reaction, washing with n-heptane yielded a solid component (c1) for producing the solid catalyst component (c). The titanium content in this solid component was 2.0 weight %.

Then, 8 L n-heptane and 400 g of the solid component (c1) synthesized as described above were introduced into the aforementioned stirrer-equipped tank that had been substituted with nitrogen; 0.6 L $SiCl_4$ was introduced as a component (c2); and a reaction was run for 2 hours at 90° C. After the completion of the reaction, 0.54 mol $(CH_2=CH)Si(CH_3)_3$ as a component (c3), 0.27 mol $(t-C_4H_9)(CH_3)Si(OCH_3)_2$ as a component (c4), and 1.5 mol $Al(C_2H_5)_3$ as a component (c5) were additionally introduced in the indicated sequence and contact was performed for 2 hours at 30° C. After the completion of this contact, thorough washing with n-heptane was carried out to obtain 390 g of a component (c) that was mainly magnesium chloride. Its titanium content was 1.8 weight %.

2. Production of Propylene-Based Block Copolymer

A 400-L stirrer-equipped stainless steel autoclave was thoroughly substituted with propylene gas and 120 L of a dried and deoxygenated n-heptane was introduced as the polymerization solvent. 30 g triethylaluminum, 12 L hydrogen, and 10 g of the aforementioned catalyst component (c) were then introduced at a temperature of 70° C. After raising the autoclave to an internal temperature of 75° C., propylene was supplied at 20.7 kg/hr and hydrogen was supplied at 20.6 L/hr. The supply of propylene and hydrogen was stopped after 200 minutes. During the interval of propylene and hydrogen supply, the pressure within the vessel gradually rose and ultimately rose to 0.46 MPaG. After this, a residual polymerization was carried out, and, at the time point at which the pressure in the vessel reached 0.35 MPaG, the gas within the reaction vessel was purged to 0.03 MPaG to obtain a propylene polymer (first stage polymerization step).

Then, the autoclave was set at an internal temperature of 65° C., followed by the introduction of 16.0 cc n-butanol and then the supply of propylene at 2.4 kg/hr and ethylene at 1.6 kg/hr. After 90 minutes, the supply of ethylene and propylene was stopped to finish the polymerization. The pressure was 0.03 MPaG at the start of ethylene and propylene supply and was 0.09 MPaG when supply was stopped (second stage polymerization step).

The obtained slurry was transferred to a following stirrer-equipped tank; 2.5 L butanol was added and treatment was carried out for 3 hours at 70° C.; transfer was then carried out to a following stirrer-equipped tank, 100 L pure water in which 20 g sodium hydroxide was dissolved was added, and a treatment was performed for 1 hour; and this was followed by separation of the water layer after quiescence to remove the catalyst residue. The slurry was processed with a centrifugal separator to remove the heptane and the heptane was then completely eliminated by treating for 3 hours in a drier at 80° C. to obtain 59.7 kg of a sample.

The obtained material was a polypropylene-based resin composition as follows: the propylene-α-olefin copolymer portion was 6.6 weight % of the total mass, contained 44.7 weight % ethylene as the α-olefin, had an intrinsic viscosity η of 14.8 dL/g, and had a ratio between the weight-average molecular weight and the number-average molecular weight (Mw/Mn) of 13.3; the propylene homopolymer portion was 93.4 weight % of the total mass; and the polypropylene-based resin composition had an MFR (230° C., load of 2.16 kg) of 12 g/10 minutes, exhibited strain hardening ("yes" for strain hardening) in an extensional viscosity measurement at 180° C., and had a degree of strain hardening (λmax (10)) of 2.0.

(Materials A-2 to A-7 and A-9 to A-11)

Materials with the compositions and properties given in Table 1 were obtained by the same method as for material A-1 by adjusting the amount of hydrogen and ethylene.

(Material A-8)

Homopolypropylene (product of Japan Polypropylene Corporation, product name "Novatec (registered trademark) PP MA 3", MFR (230° C., 2.16 kg load): 10 g/10 minutes) was used.

The properties of materials A-1 to A-11 are given in the following Table 1.

TABLE 1

|  |  | material A-1 | material A-2 | material A-3 | material A-4 | material A-5 | material A-6 | material A-7 | material A-8 | material A-9 | material A-10 | material A-11 |
|---|---|---|---|---|---|---|---|---|---|---|---|---|
| component (A1) | content | 6.6 | 8.1 | 13.1 | 14.7 | 13.9 | 10.1 | 23.0 | 0.0 | 10.0 | 10.0 | 10.0 |
|  | α-olefin content | 44.7 | 46.3 | 81.3 | 46.1 | 78.9 | 88.8 | 64.2 | — | 32.0 | 16.6 | 20.2 |
|  | intrinsic viscosity η | 14.8 | 9.9 | 7.5 | 3.8 | 9.8 | 10.1 | 7.2 | — | 9.7 | 8.7 | 10.0 |
|  | Mw/Mn | 13.3 | 6.3 | 8.4 | 4.7 | 7.3 | 18.4 | 5.1 | — | 5.8 | 6.2 | 6.7 |
| component (A2) | content | 93.4 | 91.9 | 86.9 | 85.3 | 86.1 | 89.9 | 77.0 | 100.0 | 90.0 | 90.0 | 90.0 |
| total mass | MFR | 12.0 | 9.0 | 8.0 | 10.0 | 1.5 | 2.7 | 1.2 | 10.0 | 6.2 | 5.2 | 5.8 |
|  | strain hardening | yes | yes | yes | no | yes | yes | yes | no | yes | yes | yes |
|  | λmax (10) | 2.0 | 2.4 | 1.2 | — | 1.3 | 2.2 | 1.9 | — | 2.4 | 3.3 | 2.9 |

(Material B-1)

70 L n-heptane, 3 g Mg-supported titanium catalyst (solid catalyst prepared proceeding as in Example 1 of Japanese Patent Application Laid-open No. H4-348113), and 10 g triethylaluminum were added to a 200-L stainless steel autoclave; the temperature was raised to 70° C.; and hydrogen and propylene were supplied to produce a propylene homopolymer with MFR=50 g/10 minutes in an amount corresponding to 70 weight % of the total polymer. A resin composition was then prepared by purging the hydrogen and supplying ethylene and propylene to produce, in an amount corresponding to 30 weight % of the total polymer, an ethylene • propylene copolymer having an ethylene content of 10 weight % and a weight-average molecular weight of 4,800,000.

(Materials B-2 to B-9)

Resin compositions with various indices were obtained by the same method as for material B-1, but changing the polymerization conditions for the propylene homopolymer (first stage polymerization step) and the ethylene • propylene copolymer (second stage polymerization step).

The properties of these materials B-1 to B-9 are given in the following Table 2.

For the individual materials A and materials B described above, pellets of each component were obtained by adding the following as additives to 100 weight parts of the particular propylene-based resin composition and melt mixing in a twin-screw extruder at 200° C.: 0.1 weight parts tetrakis[methylene-3-(3',5'-di-t-butyl-4'-hydroxyphenyl) propionate] methane (trade name: "IRGANOX 1010", from Ciba Specialty Chemicals Corporation) as a phenolic antioxidant, 0.1 weight parts tris(2,4-di-t-butylphenyl) phosphite (trade name: "IRGAFOS 168", from Ciba Specialty Chemicals Corporation) as a phosphite-type antioxidant, and 0.1 weight parts calcium stearate (trade name: "Calcium Stearate", from the NOF Corporation) as a neutralizing agent.

Examples 1-1 to 1-3 and 1-7 to 1-9 and Comparative Examples 1-1 to 1-5

Evaluation of Foam Extrusion Using a Slit Die

Using the pellets of the particular components described in Table 3, mixing by dry blending was carried out with 0.5 weight parts of a foaming agent (sodium bicarbonate/citric acid-type chemical foaming agent, trade name: "CF40E", from Clariant) as a foam nucleating agent. Extrusion was performed at an extrusion rate of approximately 60 kg/hour using a 65 cpmm extruder (from PLA GIKEN Co., Ltd., screw tip temperature=180° C.). Melting, mixing, and plasticization were first performed in the first half of the extruder; then, in the middle region of the extruder, carbon dioxide gas was injected at 0.23 kg per hour from a carbon dioxide gas quantitative feed apparatus (from Showa Tansan Co., Ltd.); in the remaining region of the extruder, the carbon dioxide gas was mixed into the plasticized resin to produce a foaming agent-containing resin in which carbon dioxide gas was uniformly dispersed; casting onto a polishing roll from a 750 mm-wide T-die (set temperature=180° C.) was subsequently carried out; and a foam sheet sample was then obtained by cooling, solidification, and take up.

The expansion ratio, open cell percentage, closed cell percentage, and cell morphology were then observed using this sheet. Since the amount of carbon dioxide gas added is

TABLE 2

|  |  | material B-1 | material B-2 | material B-3 | material B-4 | material B-5 | material B-6 | material B-7 | material B-8 | material B-9 |
|---|---|---|---|---|---|---|---|---|---|---|
| component (B1) | content | 70 | 80 | 70 | 80 | 80 | 40 | 91 | 70 | 80 |
|  | MFR | 50 | 40 | 100 | 40 | 40 | 50 | 10 | 20 | 200 |
|  | comonomer content | 0 | 0 | 0 | 0 | 0 | 0 | 0 | 0 | 0 |
| component (B2) | content | 30 | 20 | 30 | 20 | 20 | 60 | 9 | 30 | 20 |
|  | comonomer content | 10 | 10 | 6 | 0 | 80 | 10 | 10 | 10 | 10 |
|  | Mw (10⁴) | 480 | 360 | 54 | 360 | 360 | 180 | 180 | 45 | 180 |
| total mass | MFR | 1 | 5 | 4 | 5 | 5 | 0.3 | 5 | 8 | 28 |
|  | MT | 37 | 30 | 17 | 100 | 2 | 90 | 2 | 2 | 1 |
|  | 0.97*log MFR + 1.23 | 1.23 | 1.91 | 1.81 | 1.91 | 1.91 | 0.72 | 1.91 | 2.11 | 2.63 |
|  | τD | 800 | 380 | 150 | 1800 | 80 | 1200 | 60 | 50 | 40 | an amount of gas sufficient to obtain a range having 2.5 times as the minimum, at below this range the material can be rated as a material that is resistant to inflation, i.e., as a material not suitable for foaming.

Open cell percentage (unit: %) and closed cell percentage (unit: %):

The air specific gravity was measured using an air pycnometer (Model 930 from Toshiba-Beckman Co., Ltd.) as the measurement instrument, and the open cell percentage and closed cell percentage were measured using the following formulas and excluding the deposition of any nonfoam layer due to multilayering.

Container Appearance:

◯: Unevenness in container appearance, bridging, and so forth, were not produced and maintenance of the wall thickness was also favorable and an excellent container was obtained.

Δ: Some bridging and so forth, was produced, as was some unevenness in container appearance, and maintenance of the wall thickness was somewhat unsatisfactory, but a useable container was obtained.

×: A container was obtained in which bridging and so forth, was produced, there was severe unevenness in container appearance, and maintenance of the wall thickness was unsatisfactory.

These results are shown in Table 3 below.

TABLE 3

|  |  | examples |  |  |  |  |  | comparative examples |  |  |  |  |
|---|---|---|---|---|---|---|---|---|---|---|---|---|
|  |  | 1-1 | 1-2 | 1-3 | 1-7 | 1-8 | 1-9 | 1-1 | 1-2 | 1-3 | 1-4 | 1-5 |
| component (A) |  | A-1 | A-2 | A-3 | A-9 | A-10 | A-11 | A-4 | A-5 | A-6 | A-7 | A-8 |
| component (A1) | content | 6.6 | 8.1 | 13.1 | 10.0 | 10.0 | 10.0 | 14.7 | 13.9 | 10.1 | 23.0 | 0.0 |
|  | α-olefin content | 44.7 | 46.3 | 81.3 | 32.0 | 16.6 | 20.2 | 46.1 | 78.9 | 88.8 | 64.2 | — |
|  | intrinsic viscosity η | 14.8 | 9.9 | 7.5 | 9.7 | 8.7 | 10.0 | 3.8 | 9.8 | 10.1 | 7.2 | — |
|  | Mw/Mn | 13.3 | 6.3 | 8.4 | 5.8 | 6.2 | 6.7 | 4.7 | 7.3 | 18.4 | 5.1 | — |
| component (A2) | content | 93.4 | 91.9 | 86.9 | 90.0 | 90.0 | 90.0 | 85.3 | 86.1 | 89.9 | 77.0 | 100.0 |
| total mass | MFR | 12.0 | 9.0 | 8.0 | 6.2 | 5.2 | 5.8 | 10.0 | 1.5 | 2.7 | 1.2 | 10.0 |
|  | λmax (10) | 2.0 | 2.4 | 1.2 | 2.4 | 3.3 | 2.9 | none | 1.3 | 2.2 | 1.9 | none |
| thickness, mm |  | 1.5 | 1.5 | 1.5 | 1.5 | 1.5 | 1.5 | 1.0 | 1.4 | 1.5 | 1.6 | 1.0 |
| specific gravity, g/cc |  | 0.30 | 0.25 | 0.30 | 0.32 | 0.32 | 0.31 | 0.28 | 0.43 | 0.37 | 0.32 | 0.49 |
| expansion ratio, times |  | 3.0 | 3.5 | 3.0 | 2.8 | 2.9 | 2.9 | 3.0 | 2.1 | 2.4 | 2.8 | 1.9 |
| open cell percentage, vol % |  | 15 | 17 | 28 | 16 | 12 | 10 | 52 | 76 | 70 | 74 | 89 |
| closed cell percentage, vol % |  | 85 | 83 | 72 | 84 | 88 | 90 | 48 | 24 | 30 | 26 | 11 |
| container moldability |  | ◯ | ◯ | ◯ | ◯ | ◯ | ◯ | × | ◯ | ◯ | ◯ | × |
| container appearance |  | ◯ | ◯ | ◯ | ◯ | ◯ | ◯ | × | × | × | × | × | open cell percentage=(apparent foam layer volume−measurement value)×100/apparent foam layer volume closed cell percentage=(measurement value−foam layer weight/0.9)/apparent foam layer volume×100

Evaluation in Thermoforming

Using the sheet obtained as described above, round containers of length 22 cm, width 22 cm, and depth 5 cm were fabricated using a vacuum pressure molder from Asano Laboratories Co., Ltd., and an upper and lower heater temperature of 380° C., and the container moldability and appearance were visually evaluated.

The following scales were used for the evaluations.

Container Moldability:

◯: Molding could be performed without problems such as sagging during molding and film rupture during heating.

Δ: Some sagging occurred, but film rupture during heating did not occur and molding could be performed.

×: There was substantial sagging and/or film rupture during heating occurred, and molding could not be performed.

Examples 1-4 to 1-6 and Comparative Examples 1-6 to 1-9

Evaluation of Foam Extrusion Using a Blow Molder:

Using the pellets of the components indicated in Table 4, mixing by dry blending was carried out with 3 weight parts of the aforementioned "CF40E" foaming agent (sodium bicarbonate, citric acid-type chemical foaming agent) as a foam nucleating agent, followed by supply to a direct blow molder with a die temperature set to 170° C. to obtain a foamed parison.

Appearance of the Surface of the Molded Article:

The surface smoothness of the obtained foamed parison was evaluated using the following 3 levels.

◯: smooth when the surface is manually rubbed

Δ: coarse when the surface is manually rubbed

×: unevenness is felt when the surface is manually rubbed

In this case, ◯ and Δ are levels judged to be practically useful.

Expansion Ratio:

The ratio between the specific gravity of the polypropylene-based resin composition used as the starting material and the specific gravity of the obtained foamed parison was used as the expansion ratio. The specific gravity was determined by the water displacement method.

An expansion ratio of 1.8 times and greater is considered to be excellent.

The results of these evaluations are given in Table 4.

TABLE 4

|  |  | examples | | | comparative examples | | | |
|---|---|---|---|---|---|---|---|---|
|  |  | 1-4 | 1-5 | 1-6 | 1-6 | 1-7 | 1-8 | 1-9 |
| component (A) |  | A-1 | A-2 | A-3 | A-4 | A-5 | A-6 | A-7 |
| component (A1) | content | 6.6 | 8.1 | 13.1 | 14.7 | 13.9 | 10.1 | 23.0 |
|  | α-olefin content | 44.7 | 46.3 | 81.3 | 46.1 | 78.9 | 88.8 | 64.2 |
|  | intrinsic viscosity η | 14.8 | 9.9 | 1.5 | 3.8 | 9.8 | 10.1 | 7.2 |
|  | Mw/Mn | 13.3 | 6.3 | 8.4 | 4.7 | 7.3 | 18.4 | 5.1 |
| component (A2) | content | 93.4 | 91.9 | 86.9 | 85.3 | 86.1 | 89.9 | 77.0 |
| total mass | MFR | 12.0 | 9.0 | 8.0 | 10.0 | 1.5 | 2.7 | 1.2 |
|  | λmax (10) | 2.0 | 2.4 | 1.2 | none | 1.3 | 2.2 | 1.9 |
| thickness, mm |  | 3.0 | 3.2 | 2.8 | 2.2 | 2.1 | 2.0 | 1.7 |
| specific gravity, g/cc |  | 0.45 | 0.43 | 0.47 | 0.60 | 0.64 | 0.69 | 0.75 |
| expansion ratio, times |  | 2.0 | 2.1 | 1.9 | 1.5 | 1.4 | 1.3 | 1.2 |
| appearance of the molded article |  | ○ | ○ | ○ | × | Δ | Δ | ○ |

Examples 2-1 to 2-7, 12 to 14, and Comparative Examples 2-1 to 2-12

Evaluation of Foam Extrusion Using a Slit Die

Using the pellets of the particular components described in Tables 3 to 5, mixing by dry blending was carried out with 0.5 weight parts of a foaming agent (sodium bicarbonate/citric acid-type chemical foaming agent, trade name: "CF40E", from Clariant) as a foam nucleating agent. Extrusion was performed at an extrusion rate of approximately 60 kg/hour using a 65 calm extruder (from PLA GIKEN Co., Ltd., screw tip temperature=180° C.). Melting, mixing, and plasticization were first performed in the first half of the extruder; then, in the middle region of the extruder, carbon dioxide gas was injected at 0.23 kg per hour from a carbon dioxide gas quantitative feed apparatus (from Showa Tansan Co., Ltd.); in the remaining region of the extruder, the carbon dioxide gas was mixed into the plasticized resin to produce a foaming agent-containing resin in which carbon dioxide gas was uniformly dispersed; casting onto a polishing roll from a 750 mm-wide T-die (set temperature=180° C.) was subsequently carried out; and a foam sheet sample was then obtained by cooling, solidification, and take up.

The expansion ratio, open cell percentage, closed cell percentage, and cell morphology were then observed using this sheet. Since the amount of carbon dioxide gas added is an amount of gas sufficient to obtain a range having 2.5 times as the minimum, at below this range the material can be rated as a material that is resistant to inflation, i.e., as a material not suitable for foaming.

Open cell percentage (unit: %) and closed cell percentage (unit: %):

The air specific gravity was measured using an air pycnometer (Model 930 from Toshiba-Beckman Co., Ltd.) as the measurement instrument, and the open cell percentage and closed cell percentage were measured using the following formulas and excluding the deposition of any nonfoam layer due to multilayering.

open cell percentage=(apparent foam layer volume−measurement value)×100/apparent foam layer volume closed cell percentage=(measurement value−foam layer weight/0.9)/apparent foam layer volume× 100

Evaluation in Thermoforming

Using the sheet obtained as described above, round containers of length 22 cm, width 22 cm, and depth 5 cm were fabricated using a vacuum pressure molder from Asano Laboratories Co., Ltd., and an upper and lower heater temperature of 380° C., and the container moldability and appearance were visually evaluated.

The following scales were used for the evaluations.
Container Moldability:
○: Molding could be performed without problems such as sagging during molding and film rupture during heating.
Δ: Some sagging occurred, but film rupture during heating did not occur and molding could be performed.
×: There was substantial sagging and/or film rupture during heating occurred, and molding could not be performed.
Container Appearance:
○: Unevenness in container appearance, bridging, and so forth, were not produced and maintenance of the wall thickness was also favorable and an excellent container was obtained.
Δ: Some bridging and so forth, was produced, as was some unevenness in container appearance, and maintenance of the wall thickness was somewhat unsatisfactory, but a useable container was obtained.
×: A container was obtained in which bridging and so forth, was produced, there was severe unevenness in container appearance, and maintenance of the wall thickness was unsatisfactory.

These results are shown in Tables 5 to 7 below.

TABLE 5

|  | Example 2-1 | Example 2-2 | Example 2-3 | Example 2-4 | Comparative Example 2-1 | Example 2-5 | Example 2-13 |
|---|---|---|---|---|---|---|---|
| component (A) | A-1 | A-1 | A-1 | A-1 | A-1 | A-1 | A-1 |
| amount of addition | 80 | 80 | 80 | 70 | 65 | 95 | 98 |
| component (B) | B-1 | B-2 | B-3 | B-3 | B-3 | B-3 | B-3 |
| amount of addition | 20 | 20 | 20 | 30 | 35 | 5 | 2 |
| thickness, mm | 1.4 | 1.3 | 1.5 | 1.5 | 1.3 | 1.5 | 1.5 |
| specific gravity, g/cc | 0.28 | 0.28 | 0.32 | 0.29 | 0.38 | 0.32 | 0.31 |
| expansion ratio, times | 3.2 | 3.2 | 2.8 | 3.1 | 2.4 | 2.8 | 2.9 |
| open cell percentage, vol % | 9 | 7 | 14 | 19 | 31 | 13 | 16 |

TABLE 5-continued

|  | Example 2-1 | Example 2-2 | Example 2-3 | Example 2-4 | Comparative Example 2-1 | Example 2-5 | Example 2-13 |
|---|---|---|---|---|---|---|---|
| closed cell percentage, vol % | 91 | 93 | 86 | 81 | 69 | 87 | 84 |
| container moldability | ○ | ○ | ○ | ○ | ○ | ○ | ○ |
| container appearance | ○ | ○ | ○ | Δ | x | ○ | ○ |

TABLE 6

|  | Example 2-1 | Example 2-6 | Example 2-7 | Comparative Example 2-2 | Comparative Example 2-3 | Comparative Example 2-4 | Comparative Example 2-5 | Comparative Example 2-6 | Example 2-12 |
|---|---|---|---|---|---|---|---|---|---|
| component (A) | A-1 | A-2 | A-3 | A-4 | A-5 | A-6 | A-7 | A-8 | A-11 |
| amount of addition | 80 | 80 | 80 | 80 | 80 | 80 | 80 | 80 | 80 |
| component (B) | B-1 | B-1 | B-1 | B-1 | B-1 | B-1 | B-1 | B-1 | B-3 |
| amount of addition | 20 | 20 | 20 | 20 | 20 | 20 | 20 | 20 | 20 |
| thickness, mm | 1.4 | 1.3 | 1.5 | 1.5 | 1.5 | 1.5 | 1.5 | 1.5 | 1.5 |
| specific gravity, g/cc | 0.28 | 0.31 | 0.30 | 0.29 | 0.43 | 0.32 | 0.36 | 0.45 | 0.31 |
| expansion ratio, times | 3.2 | 2.9 | 3.0 | 3.1 | 2.1 | 2.8 | 2.5 | 2.0 | 2.9 |
| open cell percentage, vol % | 9 | 8 | 22 | 48 | 38 | 31 | 34 | 35 | 12 |
| closed cell percentage, vol % | 91 | 92 | 78 | 52 | 62 | 69 | 64 | 65 | 88 |
| container moldability | ○ | ○ | ○ | x | x | x | x | x | ○ |
| container appearance | ○ | ○ | ○ | Δ | x | x | x | x | ○ |

TABLE 7

|  | Example 2-1 | Example 2-2 | Example 2-3 | Comparative Example 2-7 | Comparative Example 2-8 | Comparative Example 2-9 | Comparative Example 2-10 | Comparative Example 2-11 | Comparative Example 2-12 |
|---|---|---|---|---|---|---|---|---|---|
| component (A) | A-1 | A-1 | A-1 | A-1 | A-1 | A-1 | A-1 | A-1 | A-1 |
| amount of addition | 80 | 80 | 80 | 80 | 80 | 80 | 80 | 81 | 82 |
| component (B) | B-1 | B-2 | B-3 | B-4 | B-5 | B-6 | B-7 | B-8 | B-9 |
| amount of addition | 20 | 20 | 20 | 30 | 35 | 5 | 2 | 3 | 4 |
| thickness, mm | 1.4 | 1.3 | 1.5 | 1.0 | 1.0 | 0.8 | 1.0 | 1.4 | 1.2 |
| specific gravity, g/cc | 0.28 | 0.28 | 0.32 | 0.38 | 0.36 | 0.50 | 0.39 | 0.33 | 0.43 |
| expansion ratio, times | 3.2 | 3.2 | 2.8 | 2.4 | 2.5 | 1.8 | 2.3 | 2.7 | 2.1 |
| open cell percentage, vol % | 9 | 7 | 14 | 43 | 36 | 24 | 32 | 32 | 31 |
| closed cell percentage, vol % | 91 | 93 | 86 | 57 | 64 | 76 | 68 | 68 | 69 |
| container moldability | ○ | ○ | ○ | Δ | Δ | Δ | Δ | x | x |
| container appearance | ○ | ○ | ○ | x | x | x | x | Δ | x |

Examples 2-8 to 2-11, 2-14, and 2-15 and Comparative Example 2-13

5. Evaluation of Foam Extrusion Using a Blow Molder:

Using the pellets of the components indicated in Table 8, and after dry blending at the ratios shown in Table 6, mixing by dry blending was carried out with 3 weight parts of the aforementioned "CF40E" foaming agent (sodium bicarbonate, citric acid-type chemical foaming agent) as a foam nucleating agent, followed by supply to a direct blow molder with a die temperature set to 170° C. to obtain a foamed parison.

Appearance of the Surface of the Molded Article:

The surface smoothness of the obtained foamed parison was evaluated using the following 3 levels.

○: smooth when the surface is manually rubbed
Δ: coarse when the surface is manually rubbed
x: unevenness is felt when the surface is manually rubbed In this case, ○ and Δ are levels judged to be practically useful.

Expansion Ratio:

The ratio between the specific gravity of the polypropylene-based resin composition used as the starting material and the specific gravity of the obtained foamed parison was used as the expansion ratio. The specific gravity was determined by the water displacement method.

An expansion ratio of 1.8 times and greater is considered to be excellent.

Resistance to Drawdown:

In the extrusion for a length of 1.0 m of a foamed parison at a die temperature set to 170° C., a ratio of the wall thickness at the upper part of the parison to the wall thickness at the lower part of the parison of 0.8 to 1.0 was rated as excellent or ○, while a ratio less than 0.8, or when molding was defective or not possible, was rated as poor or ×.

The results of these evaluations are given in Table 8.

TABLE 8

|  | Example 2-8 | Example 2-9 | Example 2-10 | Example 2-11 | Comparative Example 2-13 | Example 2-15 | Example 2-14 |
|---|---|---|---|---|---|---|---|
| component (A) | A-1 | A-1 | A-1 | A-1 | A-1 | A-1 | A-1 |
| amount of addition | 80 | 80 | 80 | 70 | 65 | 95 | 98 |
| component (B) | B-1 | B-2 | B-3 | B-3 | B-3 | B-3 | B-3 |
| amount of addition | 20 | 20 | 20 | 30 | 35 | 5 | 2 |
| thickness, mm | 3.5 | 3.5 | 3.4 | 3.4 | 3.4 | 3.1 | 3.1 |
| specific gravity, g/cc | 0.39 | 0.40 | 0.40 | 0.38 | 0.47 | 0.41 | 0.41 |
| expansion ratio, times | 2.3 | 2.3 | 2.3 | 2.4 | 1.9 | 2.2 | 2.2 |
| appearance of the molded article | ○ | ○ | ○ | Δ | × | ○ | ○ |
| resistance to drawdown | ○ | ○ | ○ | ○ | ○ | ○ | × |

INDUSTRIAL APPLICABILITY

The polypropylene-based resin composition of the present invention—because it can provide a foam molding that exhibits an excellent closed cell characteristic and excellent extrusion characteristics, that is light weight and has a rigid feel, and that has an excellent recyclability—can be very favorably used for, for example, stationery files, food containers, beverage cups, display cases, auto parts, commercial and industrial components, and trays, and thus has a very high industrial and commercial value.

The invention claimed is:

1. A polypropylene-based resin composition, comprising component (A) and component (B), wherein, based on 100 weight % sum of components (A) and (B), a component (A) content is less than 100 weight % but at least 70 weight % and a component (B) content is greater than 0 weight % but not more than 30 weight %,
wherein
component (A) is a propylene-based resin composition that comprises a propylene-α-olefin copolymer (component (A1)) and a propylene homopolymer (component (A2)),
components (A1) and (A2) are obtained by polymerization by a multistage polymerization method,
the propylene-based resin composition has a component (A1) content of 1 to 20 weight % and a component (A2) content of 99 to 80 weight %, based on a sum of components (A1) and (A2) of 100 weight %, and has a melt flow rate in the range from 5 to 20 g/10 minutes and exhibits strain hardening in a measurement of extensional viscosity at a temperature of 180° C. and a strain rate of 10 s$^{-1}$,
the propylene-α-olefin copolymer (A1) satisfies conditions (A-1) to (A-3):
(A-1) an α-olefin content of 15 to 85 weight %, where a total amount of monomer constituting component (A1) is 100 weight %;
(A-2) an intrinsic viscosity η of 5 to 20 dL/g; and
(A-3) a Mw/Mn of 5 to 15,
component (B) is a propylene-based resin composition comprising a propylene homopolymer or a propylene-α-olefin copolymer having a content of non-propylene α-olefin of less than 1 weight % (component (B1)), which has an MFR of 10 to 1000 g/10 minutes, and a propylene-α-olefin copolymer (component (B2)) that has a weight-average molecular weight of 500,000 to 10,000,000 and a content of non-propylene α-olefin of 1 to 15 weight %,
components (B1) and (B2) are obtained by polymerization by a multistage polymerization method, and
the propylene-based resin composition has a component (B1) content of 50 to 90 weight % and a component (B2) content of 50 to 10 weight %, where a sum of components (B1) and (B2) is 100 weight %, and satisfies conditions (B-1) to (B-3):
(B-1) an MFR of 0.1 to 20 g/10 minutes;
(B-2) a relationship between a melt tension (MT) and the MFR satisfying the following formula $$\log MT > -0.97 \times \log MFR + 1.23; \text{ and}$$

(B-3) a longest relaxation time (τd) of at least 100 seconds.

2. The composition according to claim 1, wherein the component (A) content is from 70 to 97 weight % and the component (B) content is from 3 to 30 weight %.

3. The composition according to claim 1, wherein component (A) has a strain hardening exponent λmax (10) of at least 1.2 in the measurement of extensional viscosity at a temperature of 180° C. and a strain rate of 10 s$^{-1}$.

4. The composition according to claim 1, wherein the α-olefin of the propylene-α-olefin copolymer (A1) is selected from the group consisting of ethylene, butene, pentene, hexene, heptene, nonene, decene, 1-methylbutene, and 1-methylpentene.

5. The composition according to claim 1, wherein the intrinsic viscosity η of the propylene-α-olefin copolymer (A1) is from 6.5 to 17 dL/g.

6. The composition according to claim 1, wherein the intrinsic viscosity η of the propylene-α-olefin copolymer (A1) is from 8 to 15 dL/g.

7. The composition according to claim 1, wherein the Mw/Mn of the propylene-α-olefin copolymer (A1) is from 10 to 15.

8. The composition according to claim 1, wherein the propylene homopolymer (A2) has a stereoregularity of at least 96%.

9. A polypropylene-based resin foam molding, wherein the molding is molded by a process comprising: adding a foaming agent to the polypropylene-based resin composition according to claim 1;

and carrying out extrusion foam molding thereof.

10. The molding according to claim 9, wherein the molding is a foam sheet molded by extrusion from a slit die or circular die.

11. A polypropylene-based resin foam thermoformed article formed by a process comprising thermoforming the foam sheet according to claim 10.

12. A polypropylene-based resin foam hollow molding, wherein the molding is a hollow molding molded by a process comprising:

adding a foaming agent to the polypropylene-based resin composition according to claim 1;
   extruding the composition to obtain a parison; and
   subsequently performing blow molding within a mold.

* * * * *